United States Patent
Quick et al.

[11] Patent Number: 6,025,916
[45] Date of Patent: Feb. 15, 2000

[54] WALL DEPOSITION THICKNESS SENSOR FOR PLASMA PROCESSING CHAMBER

[75] Inventors: Anthony K. Quick; Moshe Sarfaty; Noah H. Hershkowitz; Perry W. Sandstrom, all of Madison, Wis.

[73] Assignee: Wisconsin Alumni Research Foundation, Madison, Wis.

[21] Appl. No.: 09/182,057

[22] Filed: Oct. 29, 1998

Related U.S. Application Data

[63] Continuation-in-part of application No. 08/808,494, Feb. 27, 1997, abandoned.

[51] Int. Cl.$^7$ .................................................. G01B 9/02
[52] U.S. Cl. .......................... 356/357; 356/359; 356/382
[58] Field of Search ..................... 356/335, 345, 356/359, 360, 357, 382

[56] References Cited

U.S. PATENT DOCUMENTS

| | | | |
|---|---|---|---|
| 4,618,262 | 10/1986 | Maydan et al. | 356/357 |
| 5,465,154 | 11/1995 | Levy | 356/382 |

*Primary Examiner*—Robert H. Kim
*Attorney, Agent, or Firm*—Quarles & Brady

[57] ABSTRACT

A device for measuring polymer build-up on plasma chamber walls provides a cooled window on which a film may form. Light passing through the window outside the chamber may be measured by interferometric techniques to determine change in film thickness and thus indicate when cleaning is required and the success of cleaning operations. A sapphire window may be used to allow for air cooling and to reduce etching by the plasma. A fiber optic cable may communicate the light between the window and measurement electronics.

14 Claims, 2 Drawing Sheets

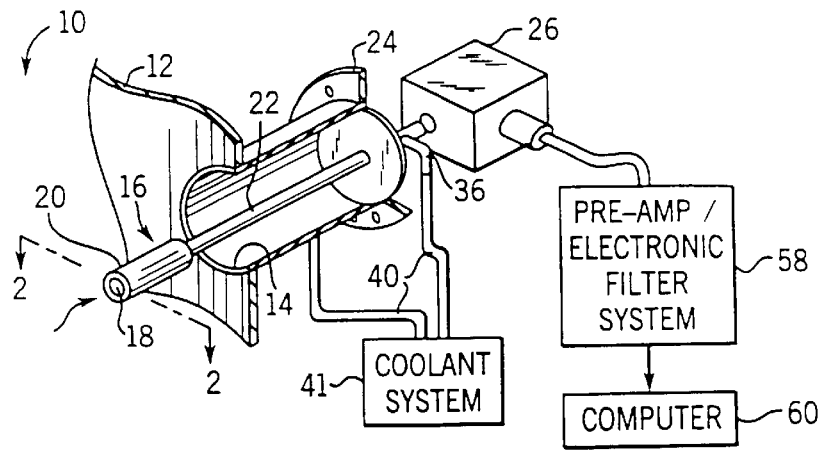
FIG. 1
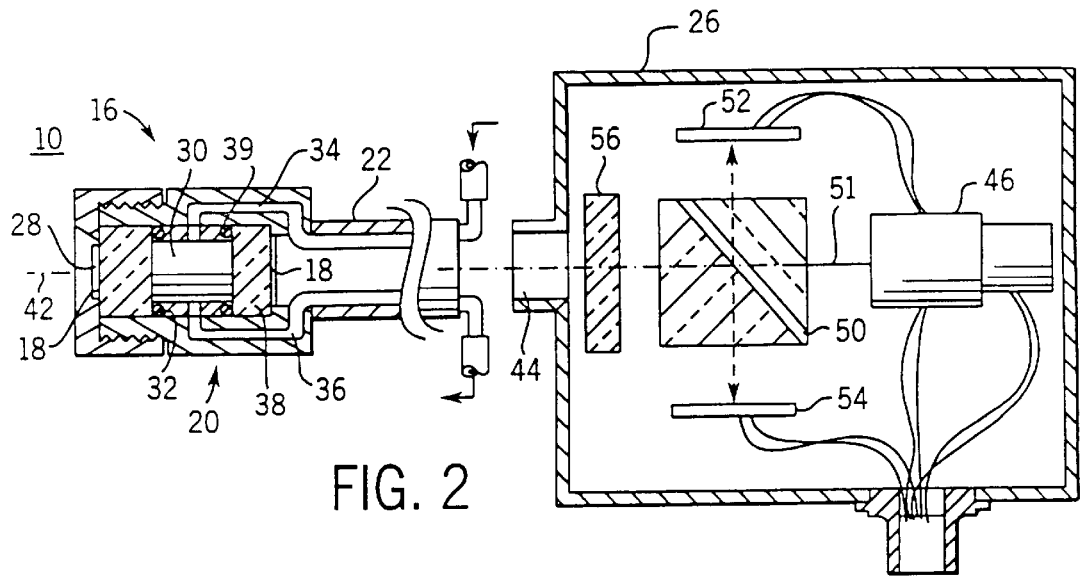
FIG. 2
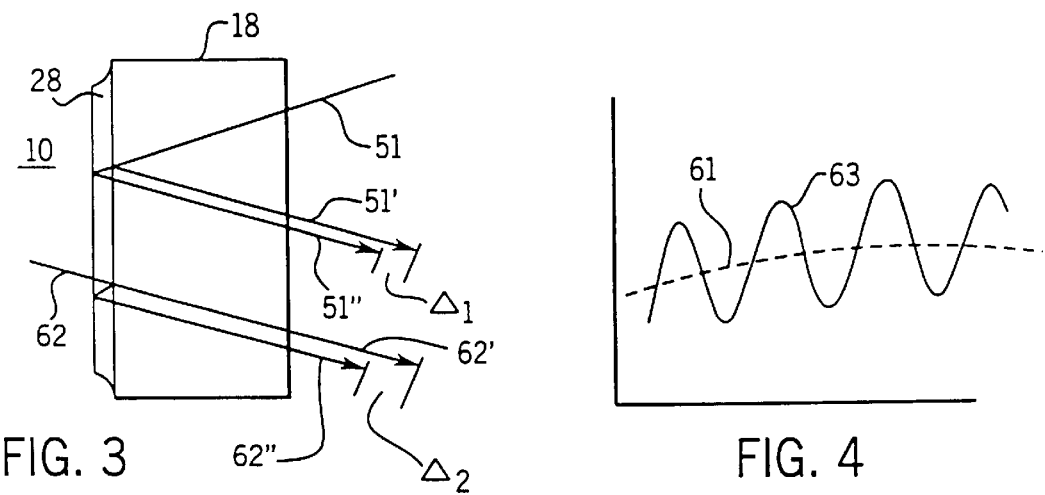
FIG. 3
FIG. 4

WALL DEPOSITION THICKNESS SENSOR FOR PLASMA PROCESSING CHAMBER

CROSS-REFERENCE TO RELATED APPLICATIONS

This application is a continuation in part of U.S. application Ser. No. 08/808,494, abandoned entitled Wall Deposition Thickness Sensor For Plasma Processing Chamber (as amended) filed Feb. 27, 1997, and hereby incorporated by reference.

STATEMENT REGARDING FEDERALLY SPONSORED RESEARCH OR DEVELOPMENT

BACKGROUND OF THE INVENTION

The present invention relates to plasma chambers and in particular to a method of measuring the build-up of film on the inner walls of such chambers.

The manufacturer of integrated circuits may employ a plasma chamber wherein semiconductor dies are treated with dopants, masked with photoresist and then etched by plasma to produce the structures needed for the particular circuit design.

Due to the nature of the plasma processing gas, a polymer film may build up on the inside wall of the plasma chamber. When this film becomes too thick, it may flake off, become trapped in the plasma and grow, eventually falling onto the dies and significantly reducing the yield. To prevent such exfoliation, the plasma chamber must be periodically cleaned, for example, by wet cleaning or oxygen ashing.

With wet cleaning, the chamber walls are cleaned with an appropriate solvent such as acetone. After this cleaning, the walls must be conditioned before the first batch of microelectronic components can be etched. Wet cleaning is a disruptive process and accordingly, it would be desired to clean the chamber as infrequently as possible.

With oxygen ashing, an oxygen plasma is introduced into the chamber to burn off the film. It can be difficult to accurately judge the length of time needed for this procedure.

BRIEF SUMMARY OF THE INVENTION

The present invention provides an accurate measurement of the build-up of film on the inner walls of a plasma chamber by simulating the surface of the chamber walls with a window within, or on the surface of, the plasma chamber. A film is deposited on the window in a manner similar to the deposition of film on the chamber walls. Interferometric techniques can then be used to monitor build-up of the film on the window during operation of the chamber and from a point outside the chamber.

Accurate measurement of the build up of the film on the chamber walls may reduce the frequency with which chamber cleaning is required and may allow accurate determination of the duration of cleaning techniques such as oxygen ashing.

Specifically, the invention provides an apparatus for measuring film deposition on a wall of a plasma chamber, the apparatus including a window positioned to have a first surface exposed to the chamber to receive a deposited film. A light sensor is positioned to receive light through a second surface of the window opposite the first surface, the light traveling to the light sensor includes light which propagates along a first and second optical path, differing in path length by an amount related to the thickness of the film. The light sensor produces an interference signal received by an electronic circuit which detects and counts variations in the interference signal over time caused by changes in the thickness of the film.

Thus it is one object of the invention to provide a simple and accurate method of measuring build-up of film on the walls of a plasma chamber. The window acts like a chamber wall but is small in area to fit within the access ports of most plasma chambers, and transparent to allow sufficient light passage for external interferometric thickness measurements.

The window may be cooled by a fluid passing along the second surface of the window to control the temperature of the window.

It is thus another object of the invention to permit the window to accurately mimic the chamber wall in terms of temperature by cooling it with a cooling fluid.

The apparatus may include a laser providing the light source wherein the laser and the light sensor are both positioned on the same side of the window and wherein the first optical path passes from the laser through the second surface of the window and is reflected from the first surface of the window back through the second surface of the window to the light sensor. The second optical path in this case passes from the laser through the second surface of the window through the first surface of the window and through the film to the surface of the film removed from the first surface of the window to be reflected back through the first and second surfaces of the window to the light sensor.

Thus, it is another object of the invention to provide a method of measuring film build-up on the walls of the plasma chamber using a stable light source that may be outside the hostile environment of the chamber itself.

The light sensor may include an optical filter matched to the wavelength of the laser and the laser may be modulated. The electronic circuitry may include a filter having a passband at the frequency of modulation.

Thus, it is another object of the invention to provide a measurement of film thickness robust against other interfering sources of light from plasma and the like.

The window may be optical sapphire.

It is thus yet another object of the invention to provide a window better resisting etching by plasma, the latter which is believed to adversely affect measurement of the interference signal, and to provide a window that may be air-cooled as made possible by the superior properties of sapphire in conduction and strength, thereby eliminating cumbersome water cooling and the risks of a water leak into the plasma chamber.

A fiber optic cable may communicate light between the window and the light sensor.

Thus, it is another object of the invention to provide greater flexibility in positioning the electric circuit with respect to the window and to provide greater electrical isolation of the electric circuit from external electrical noise from the chamber.

It is a further object of the invention to provide improved rejection of external light by virtue of the limited numeric aperture of the fibers and a more uniform illumination and measurement of the film on the window for the same reason and through a random dispersion of fibers carrying the light.

The foregoing and other objects and advantages of the invention will appear from the following description. In the description, reference is made to the accompanying drawings which form a part hereof and in which there is shown by way of illustration a preferred embodiment of the invention. Such embodiment does not necessary represent the full scope of the invention, however, and reference must be made to the claims herein for interpreting the scope of the invention.

BRIEF DESCRIPTION OF THE SEVERAL VIEWS OF THE DRAWINGS

FIG. 1 is a perspective view in partial cutaway of the apparatus of the present invention as installed in a plasma chamber and showing the principal components of a probe and its associated circuitry, the latter in block form;

FIG. 2 is a cross-section of the probe of FIG. 1 taken along lines 2—2 of FIG. 1 showing a window of the probe as exposed to the plasma chamber;

FIG. 3 is a detailed view of the window of FIG. 2 showing optical paths through the window and through a film growing on the surface of the window for two embodiments of the invention;

FIG. 4 is a graph of the intensity of received light from the window of FIG. 3 as a function of time as a film grows on the window;

DETAILED DESCRIPTION OF THE INVENTION

Figure 5:
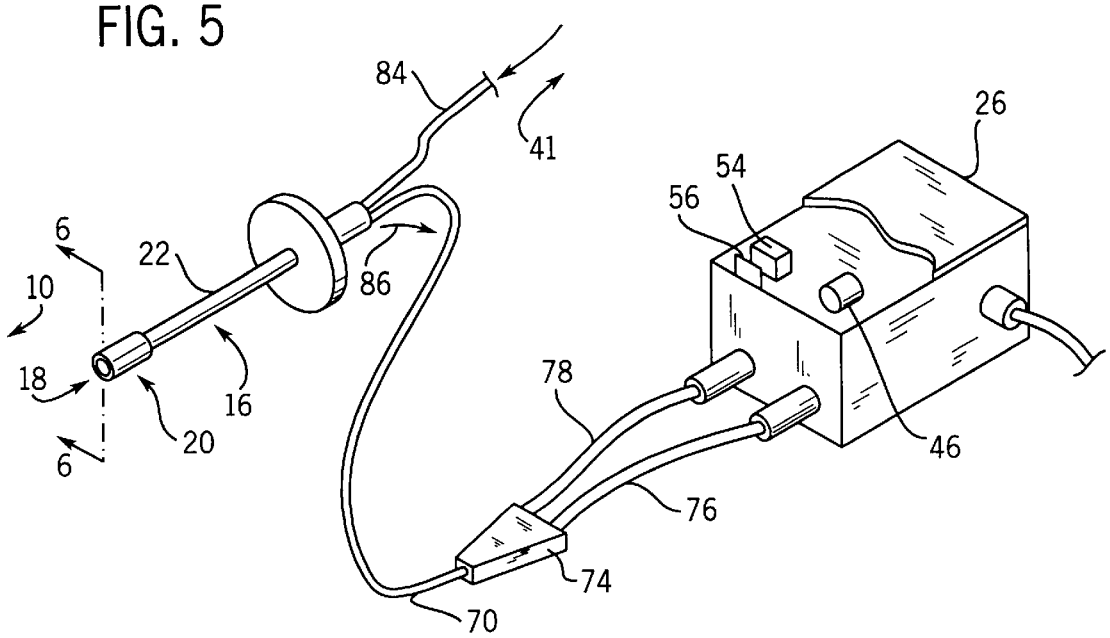
FIG. 5 is a figure similar to that of FIG. 1 showing an alternative embodiment employing a probe connected to a fiber optic cable.

Referring to FIG. 1, a plasma chamber 10 includes a wall 12 having a port 14 through which a film deposition probe 16 may be inserted into the chamber volume. The probe 16 has a window 18 onto which polymer films (not shown in FIG. 1) may be deposited in a manner similar to that of the deposition of such films on the inner surface of walls 12.

The window 18 is held in a head assembly 20 attached by means of a tube 22 to a flange 24 through which the tube 22 may pass out of the plasma chamber 10. The window 18, head assembly 20 and tube 22 are sealed to each other so as to prevent leakage between the atmosphere within the chamber 10 and that outside the chamber 10. The passage of the tube 22 through the flange 24 is likewise sealed to prevent such leakage.

An end of the tube 22 outside of the chamber 10 is open to admit a beam of light from an optical assembly 26 to pass into the tube and along its axis through the window 18.

Referring Also to FIG. 2, a first surface of the window 18, exposed to the volume of the chamber 10, may receive a deposited film 28 on its first surface during operation of the plasma chamber 10. The opposing second surface of the window 18 is positioned in front of a cavity 30 formed in the head 20 and sealed at one end by the window 18 by a compressed O-ring 32. This cavity 30 communicates with a first and second coolant pipe 34 and 36, which pass through a portion of the head 20 and then into the lumen of tube 22 to pass along its length to the far end of tube 22 outside of the chamber 10. There the pipes 34 and 36 are connected to coolant hoses 40 which in turn connect to a coolant system which passes cooled water or gas through one tube 36 and then back out the other pipe 34. The coolant system 41 may be as simple as a tank of compressed gas metered through hoses 40 or may be a closed cycle water coolant system of a type well-known in the art. The coolant is adjusted to cool the window 18 to approximately the same temperature as the walls 12 of the chamber on which film is Also being deposited.

The cavity 30 is sealed from direct communication with the lumen of the tube 22 by a second window 38 generally parallel to window 18, but spaced apart from that window 18 by the width of the cavity 30. An O-ring 39 seals window 38 against the rear of cavity 30 for this purpose. As constructed, light may freely pass along an axis 42 extending along the length of the tube 22 (through the lumen of the tube 22) and through both windows 18 and 38. Generally, the coolant fluid through pipe 34 and 36 thus flushing cavity 30 will be transparent so as not to interfere with light's passage.

Referring still to FIGS. 1 and 2, the optical assembly 26 has an aperture 44 opening next to the end of the tube 22 outside of the chamber 10 so that light from the optical assembly 26 may pass into the tube 22 along the axis 42. The optical assembly 26 may be held to the tube 22 by a gimbal mount (not shown) to ensure proper alignment of the tube.

Inside the optical assembly 26 is a laser diode 46 producing a beam of laser light directed generally along the axis 42. In a preferred embodiment, the laser has a wavelength of 650 nanometers. A pre-amplifier/electronic filter 58 (shown in FIG. 1) provides power to the laser diode 46 to modulate the laser diode with a 200 Hz square wave.

A beam splitter 50 positioned within the beam path directs a first portion of the beam toward a solid state light sensor 52, which provides an intensity signal which may be used to correct for variations in the light output of the laser diode 46. A second portion of the beam proceeds along axis 42 to an optical filter 56 having a transparency limited to the wavelength of the laser diode 46 so as to reject ambient light and light from the plasma discharge of the chamber 10. In the preferred embodiment with the laser diode 46 described above, the optical filter 56 would have a transparency limited to wavelengths within 10 nanometers of 650 nanometers.

The beam, after leaving the optical filter 56, passes through tube 22, through window 38 and to window 18.

Referring now to FIG. 3, at the interface between the front surface of window 18 and the film 28, a portion of beam 51 will be reflected backward through the window 18 as beam 51'. A second portion of the beam 51 will proceed into the film 28 and be reflected at the interface between the film 28 and the interior of the chamber 10 back along beam 51". In FIG. 3, beam 51 is angled with respect to the face of the window 18 for clarity so that beams 51, 51' and 51" may be separately depicted. In reality, beam 51 strikes the front face of window 18 at nearly right angles and so beam 51, 51' and 51" all follow the axis 42.

As a result of their different points of reflection, the path length between beams 51' and 51" are not the same, beam 51' having traveled an amount $\Delta_1$ less than beam 51".

Accordingly, beams 51' and 51" will interfere with each other so that the combination of beams 51' and 51" varies in intensity depending on the amount $\Delta_1$ which is directly proportional to the thickness of the film 28. The beams 51' and 51" return down the axis 42 toward the beam splitter after being again filtered by optical filter 56 and are this time directed by the beam splitter 50 at right angles to a second photodetector 54.

The pre-amplifier/electronic filter 58, as well as modulating the laser diode 46 Also receives the intensity signal from the solid state light sensor 52 and the interference signal from the photodiode 54. An electronic filter such as a phase lock loop is used to extract the signal from the beam 51 from other ambient light sources including that of the plasma within the chamber 10.

Referring now to FIG. 4, generally the intensity signal from diode 54, shown as sine-like waveform 63, will vary over time as the thickness of the film 28 changes, bringing beams 51' and 51" into constructive and destructive interference successively. Waveform 63 will Also vary slowly according to an average laser diode output value indicated by dotted line 61 which may be corrected for by a simple subtraction process. Waveforms 63 and 61 are sampled and digitized with a standard sampling board in computer 60 and may be processed by standard data acquisition software such as the LabVIEW system manufactured by National Instruments Corp. of Austin, Tex. to count the crests or troughs of the waveform 63, each indicating a change in the film 28 such as lengthens the optical path length of beam 51" by at least one half wavelength of the laser light. Counting troughs or crests thus provides a real time measure of the rate of growth of the film 28 and an accurate measurement of its total change in thickness such as may be used to signal the need for cleaning of the chamber 10. It will be understood that the counting of fringes may Also be used to measure a removal of the film, for example, during an oxygen ashing process.

If the index of refraction of the film is approximately 1.4, then a fringe trough will be evident for every change in thickness of the film 28 of 232 nanometers.

Referring again to FIG. 3, in a second embodiment, the laser diode 46, beam splitter 50 and solid state light sensor 52 are eliminated from the optical assembly 26 and photodetector 54 is positioned adjacent to the optical filter 56 to receive light directly along axis 42. In this case, optical filter 56 is adjusted to admit light generated by the plasma within the chamber 10. As indicated by beam 62, such light from the plasma Also exhibits interference effects with a first portion of beam 62 indicated by beam 62' passing directly through film 28 and window 18 and a second portion of the beam indicated by beam 62" reflecting off the interface between film 28 and window 18 to pass again through film 28, then to reflect off the interface between film 28 and the interior of the plasma chamber 10 to return along a path parallel to beam 62'. In this case, the difference in path lengths is $\Delta_2$ and is a function of the thickness of the film 28.

Referring now to FIG. 5, in an alternative embodiment, the need for straight line access to the plasma chamber 10 is eliminated by coupling the probe 16 to the optical assembly 26 by means of a flexible fiber optic cable 70.

Figure 6:
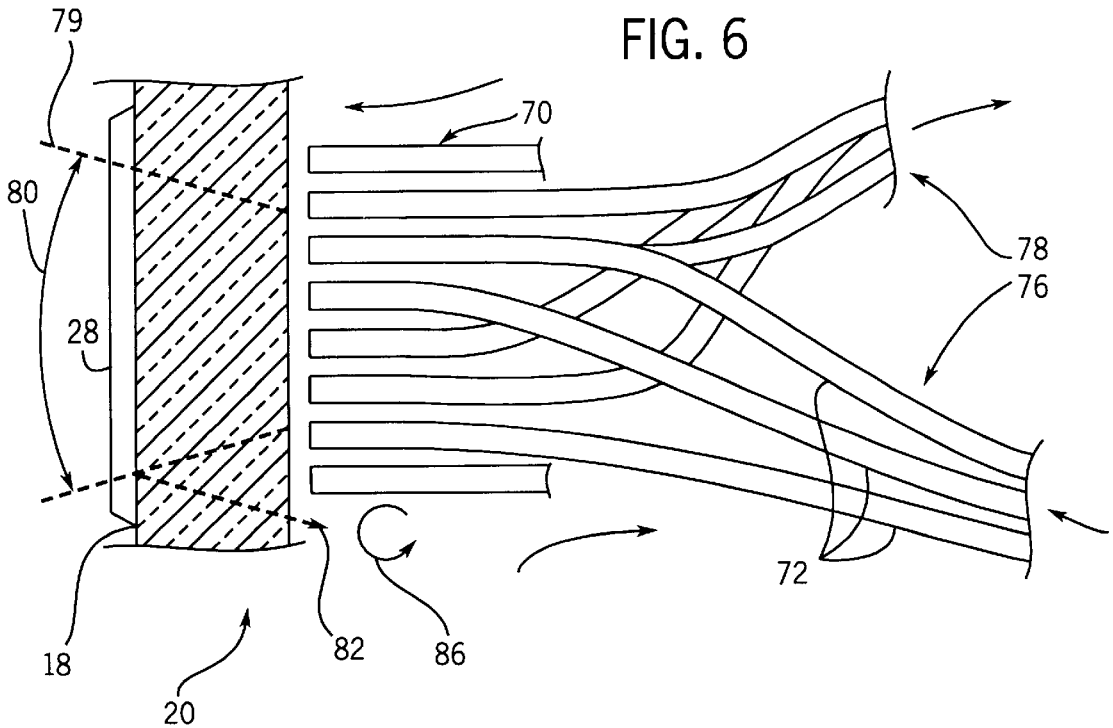
FIG. 6 is a simplified cross-sectional view of the probe and fiber optic cable along lines 6—6 of FIG. 5.

Referring also to FIG. 6, the fiber optic cable 70 includes a number of optical fibers 72 of a type well known in the art. The fibers 72 are collected at one end of the cable 70 to abut the inner surface of window 18 in an orientation substantially perpendicular to the face of that window 18.

The cable 70 extends from the window 18 out of the tube 22 to be divided at bifurcation 74 into two branches 76 and 78. Preferably the fibers 72 are randomly divided among the branches 76 and 78.

One branch 76 is coupled to the laser diode 46 to receive laser light from the laser diode 46 and transmit it to the window 18. The other branch 78 is coupled to the photo detector 54 through the optical filter 56 to transmit light from the window 18 to the photo detector 54. This arrangement eliminates the need for the beam splitter 50 of the previous embodiment and the need for alignment of the optical assembly 26 along axis 42 as shown in FIG. 2.

The electrically insulating properties of the fiber optic cable 70 allows the electronics of the optical assembly 26 to be better isolated from RF interference found to be a significant problem in the environment of the chamber 10 and in particular avoids the need for aperture 44 directed toward the chamber 10 and in close proximity thereto.

The low numerical aperture of the fibers 72 of branch 78 directed toward the window 18 eliminates received light outside of a light acceptance cone 79 having an angle 80 of approximately 23 degrees. For this reason, these fibers 72 collect mostly laser light reflected from the film 28 and have reduced acceptance of other environmental and interfering light.

The laser light exiting the fibers 72 of branch 76 near the window 18 also exits within this acceptance cone 79. In practice, however, the light emitted from the fibers 72 which is ultimately collected again after interacting with the film 28 is even more tightly collimated, however, because most of the emitted light 82 near the edge of the acceptance cone 79 (from fibers 72 of branch 76) is not reflected back to the fibers 72 of branch 78.

The interference measurement is affected by the angle of incidence of light from fibers 72 of branch 76 with respect to the surface of the film 28 (oblique rays make the film look thicker) so this additional effective collimation improves the precision of the measurement.

The randomization of the fibers 72 between the two branches 76 and 78 provides uniform illumination of the surface of the window 18 and collection of light from the window 18.

In early tests of the first embodiment, it was found that during the cleaning process with $O_2$ plasma, the interference signal would slowly decrease after the film was cleared. Although the present inventors do not wish to be bound by a particular theory, it is believed that this was caused by the glass window 18 being etched by the plasma. Accordingly, an optical sapphire ($AL_2O_3$) window is preferably used in the second embodiment. In tests the invention with a sapphire window has shown no signs of such signal loss. Further, the superior strength and heat conductivity of the sapphire compared to glass allows the sapphire window to be made thinner and still support the vacuum of the chamber. For example, a glass window 18 may have an 11 millimeter diameter and a 2 millimeter thickness, while a sapphire window 18 may have a 10.15 millimeters diameter and a 1.4 millimeter thickness. This, plus the higher heat conductivity of sapphire, allows the sensor to be cooled with temperature regulated compressed air instead of water through inlet port 84 shown in FIG. 5. The use of air cooling eliminates the need for two windows of the first embodiment and reduces the possibility of a water leak into the vacuum system. As shown in FIG. 6, the volume of air is adjusted so as to create a general turbulence 86 adjacent to the window 18 on the side of the optic fiber cable 70 and specialized channels need not be formed to conduct the air.

In all other respects, the second embodiment is the same as the first embodiment using pre-amplifier/filter 58 and computer 60.

The above description has been that of a preferred embodiment of the present invention, it will occur to those that practice the art that many modifications may be made without departing from the spirit and scope of the invention. In order to apprise the public of the various embodiments that may fall within the scope of the invention, the following claims are made.

We claim:

1. An apparatus for measuring film deposition on a wall of a plasma chamber comprising:
   a) a window through the wall positioned with a first surface exposed to the plasma chamber to receive a deposited film like that received by the wall;
   b) a light sensor positioned to receive light through a second surface of the window opposite the first surface, the light traveling to the light sensor from a light source along a first and second optical path differing in path length by an amount related to a thickness of the film, the light sensor producing an interference signal related to the thickness of the film; and c) an electronic circuit receiving the interference signal to detect and count variations of the interference signal over time caused by changes in the thickness of the film.

2. The apparatus of claim 1 including a coolant system passing a cooled fluid across the second surface of the window to control the temperature of the window.

3. The apparatus of claim 1 including a laser providing the light source and wherein the laser and the light sensor are positioned on the same side of the window and wherein the first optical path passes from the laser through the second surface of the window and is reflected from the first surface of the window back through the second surface to the light sensor and wherein the second optical path passes from the laser through the second surface of the window through the first surface of the window through the film to a surface of the film removed from the first surface of the window, to be reflected back through the first and second surfaces of the window to the light sensor.

4. The apparatus of claim 3 wherein the light sensor includes an optical filter passing light primarily at the wavelength of the laser.

5. The apparatus of claim 3 wherein the laser is modulated and wherein the electronic circuit includes an electronic filter having a passband tuned to the modulation.

6. The apparatus of claim 1 wherein plasma provides the light source and wherein the plasma and the light sensor are positioned on the opposite sides of the window and wherein the first optical path passes from the plasma through the film and the first and second surfaces of the window to the light sensor and wherein the second optical path passes from the plasma through film to the first surface where it is reflected back into the film then reflected from a surface of the film closest to the plasma back through the film then through the first and second surfaces to the light sensor.

7. The apparatus of claim 1 wherein the light sensor includes an optical filter passing light at a wavelength of that emitted by the plasma.

8. The apparatus of claim 2 wherein the coolant system cools the window to substantially the temperature of the wall.

9. The apparatus of claim 2 wherein the cooled fluid is transparent to the light.

10. The apparatus of claim 1 wherein the window is optical sapphire.

11. The apparatus of claim 2 wherein the coolant system uses temperature regulated air as the cooled fluid.

12. The apparatus of claim 1, including a fiber optic cable communicating between the window and the light sensor.

13. The apparatus of claim 11 wherein the window is optical sapphire.

14. An apparatus for measuring film deposition on a wall of a plasma chamber comprising:

(a) a window through the wall positioned with a first surface exposed to the plasma chamber to receive a deposited film like that received by the wall;

(b) a fiber optic cable having a number of fibers, a first end of the fiber optical cable collecting ends of the fibers adjacent to a second surface of the window to receive light through the second surface of the window opposite the first surface, the fiber optic cable further having second bifurcated end with fibers distributed between two branches;

(c) a laser positioned to couple light into a first branch of the fiber optic cable.

(d) a light sensor positioned to receive light from a second branch of the fiber optic cable wherein the light travels to the light sensor from the laser along a first and second optical path differing in path length by an amount related to the thickness of the film, the light sensor thereby producing an interference signal; and (e) an electronic circuit receiving the interference signal to detect and count variations of the interference signal over time caused by changes in the thickness of the film.

* * * * *

UNITED STATES PATENT AND TRADEMARK OFFICE
CERTIFICATE OF CORRECTION

PATENT : 6,025,916
DATED : February 15, 2000
INVENTOR(S): Anthony K. Quick; Moshe Sarfaty; Noah H. Hershkowitz; Perry W. Sandstrom It is certified that error appears in the above-identified patent and that said Letters Patent is hereby corrected as shown below:

Column 1. line 5, add the following:

--This invention was made with United States government support awarded by the following agencies: NSF Grant No. 8721545. The United States has certain rights in this invention.--

Signed and Sealed this

Fifteenth Day of May, 2001

Attest:

NICHOLAS P. GODICI

Attesting Officer   Acting Director of the United States Patent and Trademark Office